(12) United States Patent
Jenkins et al.

(10) Patent No.: US 6,767,205 B1
(45) Date of Patent: Jul. 27, 2004

(54) HOUSING FOR AN OPTICAL FIBER PREFORM TORCH

(75) Inventors: Hodge E. Jenkins, McDonough, GA (US); Lazhar Mazlout, Duluth, GA (US); Tadeusz Olewicz, Hoschton, GA (US); Fred P. Partus, Atlanta, GA (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 10/397,029

(22) Filed: Mar. 25, 2003

(51) Int. Cl.⁷ .............................................. F23D 11/36
(52) U.S. Cl. ...................... 431/343; 431/153; 431/159; 431/354; 239/423; 239/424.5
(58) Field of Search ............................... 431/354, 345, 431/350, 353, 154, 159, 187, 349, 351; 239/398, 424.5, 423; 65/407

(56) References Cited

U.S. PATENT DOCUMENTS

| | | | |
|---|---|---|---|
| 4,155,702 A | * 5/1979 | Miller et al. | 431/353 |
| 4,627,866 A | 12/1986 | Kanamori et al. | 65/3.12 |
| 4,664,619 A | * 5/1987 | Johnson et al. | 431/154 |
| 4,689,065 A | * 8/1987 | Krause | 65/407 |
| 4,810,189 A | * 3/1989 | Mikami et al. | 431/354 |
| 5,542,841 A | * 8/1996 | Nakashima et al. | 431/160 |
| 5,553,602 A | * 9/1996 | Ridenour | 126/91 A |

OTHER PUBLICATIONS

U.S. application Ser. No. 10/215,837; filed Aug. 9, 2002 to Olewicz, entitled Torch Mount for High Deposition Glass Torches.

* cited by examiner

*Primary Examiner*—James C. Yeung
(74) *Attorney, Agent, or Firm*—Thomas, Kayden, Horstemeyer & Risley LLP

(57) ABSTRACT

A torch and mount assembly wherein the torch, which has a plurality of gas receiving nipples is carried in a housing through which it extends. The housing has a plurality of walls forming a substantially air tight enclosure. In at least one wall of the housing are one or more leakproof fittings which are connected to similar leakproof fittings for the nipples by means of preferably flexible gas conduits within the housing. In the system, gaseous mixtures are applied from a source or sources to the fittings in the housing wall remote from the high temperatures of the torch, while the conduits within the housing are protected from mechanical and thermal stresses. An inert gas from a suitable source is introduced under pressure into the interior of the housing to reduce leakage from the torch into the housing. The atmosphere within the housing is heated, and the constituents of the housing atmosphere are monitored to aid in detecting leakage.

18 Claims, 4 Drawing Sheets

HOUSING FOR AN OPTICAL FIBER PREFORM TORCH

RELATED APPLICATIONS

This application is related to and deals with similar subject matter to U.S. patent application Ser. No. 10/215,837 of Tadeusz Olewicz, filed Aug. 9, 2002, the disclosure of which is incorporated herein by reference.

FIELD OF THE INVENTION

This invention relates to a torch assembly for use in a vapor axial deposition (VAD) process in forming optical fiber glass preforms.

BACKGROUND OF THE INVENTION

In the fabrication of optical fibers, it is customary to create a preform, which is a long glass rod having a central core and which is, in effect, a magnified or enlarged version of the optical fiber to be drawn therefrom. The preform consists of an inner core and an external cladding having an index of refraction profile that reproduces the index profile of the drawn fiber.

There are three major processes for making preforms, the modified chemical vapor deposition (MCVD) process, the outside vapor deposition (OVD) process, and the vapor axial deposition (VAD) process. All of these processes utilize vapor deposition, in which a "soot" is deposited on the surface of a starting object such as the interior surface of a starter tube or a starting or target rod to form a glassy layer on the surface.

It is with the VAD process that the present invention is primarily concerned, although it is to be understood that the principles and features of the invention are adaptable to other processes as well.

In the VAD process, silica vapors flowing through a heating torch deposit the desired silica particle layers on the rod. As the sooty particles build up to a desired diameter, the target rod is moved upward to make room for further growth, while the torch or torches are fixed in position. When the build-up or deposition is complete, the rod is removed and the resulting preform is sintered or consolidated into a solid preform.

Although the VAD process is widely used, in a production milieu certain problems arise which prevent complete satisfaction with the method, and more particularly, the apparatus. Thus, the glass torches, which must be precisely set for satisfactory and reproducible results, tend, over an extended period of use to become leaky, unstable, and not very consistent in producing repeatable results. For example, the various gases and vapors fed to the torch are generally transmitted through plastic tubing to Teflon fittings which, in turn, connect to the glass torch nipples. These Teflon fittings tend to loosen up over extended periods of use, which can, and often does, give rise to leakage, thereby destroying the calibrated delivery of the gases and vapors to the torch. The tendency to loosen is due, at least in part, to temperature fluctuations and also to lack of strain relief in the plastic delivery tubing. Lack of strain relief is a very important problem, since even small mechanical stress on the tubing can loosen the Teflon to glass interface and cause leaks. For example, during routine machine maintenance, the mechanic can accidentally push the tubing and thereby loosen the interface. A further problem, which can actually be more serious in that it can shut down the production line, is that heretofore the mounting of the tubular glass torch to the adjustable mounts, made necessary for precise positioning of the torch, can cause cracking or breaking of the glass of the torch, necessitating replacement thereof, which can cause as much as a week's delay in production. The glass tube of the torch is, generally, clamped to the adjustment stages using a V-block type clamp. By nature, the glass torch is extremely delicate as well as expensive, and in use, this type of clamping technique, if too tight a clamp, can cause cracking or breakage of the glass and, too loose a clamp results in process instability, thus a certain amount of operator skill is required in positioning and clamping the torch.

U.S. patent application Ser. No. 10/215,837 (hereinafter Olewicz), discloses and claims a torch assembly which is designed to and does obviate many of the aforementioned drawbacks of prior art torch assemblies. The invention of that application comprises a non-fragile mounting system having a cylindrical main glass tube surrounded by a tough and rigid tube of metal. The metallic tube is threaded at each end for receiving compression nuts, each having a ferrule such as an O-ring or a tapered ring inside. Each ferrule is a slip fit over the main glass tube of the torch and has an angled surface that butts against the end of the metallic tube. When the nuts are tightened, the sloped surfaces of the ferrules force the ferrules against the main glass tube, thereby fixing it in place within the metal tube. The metal tube in turn is clamped by a mounting clamp which is, in turn, mounted to an adjustment stage for optimum positioning of the torch. A support rail has adjustably mounted thereon one or more strain relieving clamps for holding gas or vapor delivery tubes in place to insure proper delivery of gases and vapors to the torch. More specifically, the glass torch comprises an outer main tubular body within which may be a plurality of coaxial glass tubular bodies of diminishing size for creating a plurality of gas and/or vapor delivery passages. Such nested nozzles are shown, for example, in U.S. Pat. No. 4,627,866 of Kanamori et al., and in accordance with the Olewicz invention each of the concentric delivery passages is attached to Teflon fittings connected to glass nipples formed on the nested nozzles. The stress induced in the glass main nozzle of the torch is evenly distributed over an area around the entire torch periphery and is well below critical temperature levels for glass. It has been found that hand tightening the compression nuts is more than adequate to secure the torch firmly within the glass clamp tube. Thus, the danger of too much stress being applied to the torch main tube even during temperature fluctuations, which heretofore could produce cracking or breaking, is no longer a consideration. The torch clamp tube, and not the thin glass tube, is used to mount the torch to the adjustment stages. The mounting arrangement of the invention, therefore, is more robust and safe, and provides several other benefits in addition to those just discussed. For example, the ferrule is made of elastic and resilient material such as Viton or Teflon, or other high temperature plastic and acts as a temperature compensating member during expansion and contraction of the glass and the metal. It also acts as a heat isolator allowing the gases within the torch to stay warm; acts as a vibration and shock isolator/damper, thereby protecting the glass torch; and it provides easy rotary and linear (in/out) coarse torch alignment adjustment.

The aforementioned Olewicz torch assembly overcomes many of the problems discussed in the foregoing, but it has been found that the Teflon fittings, under extremes of heat, tend to expand more than the glass of the torch, giving rise to leaks and, further, when the torch is moved, there can be relative movement between the glass ports and the fittings, giving rise to further leakage. For the most part, these leaks are small, at least to begin with, and thus can remain undetected while, at the same time, reducing the quality of the glass rods produced by the system. Thus, in order to insure quality production by the torch assembly, it is desirable that the heat effects on the fittings and movement thereof be reduced to a minimum, and early detection or leaks be achieved by the torch system.

SUMMARY OF THE INVENTION

The present invention comprises a torch housing assembly that isolates the torch from stresses originating outside the housing, e.g., mechanical stresses associated with assembly and disassembly, and stresses resulting from movement of the gas feed lines relative to the torch, e.g., movement of the torch to desired heating areas of the rod. The housing further makes possible fixed, relatively stress free, connections to the gas feed lines and allows a measure of observation of the torch and gas supply while in use, thereby facilitating detection of cracks and leaks in the torch assembly. The housing itself is substantially air tight when the torch is mounted therein In greater detail a torch such as that shown in Olewicz is mounted in the housing, with all of the gas feeds to the individual glass tubes being contained in the housing. Each of the several glass nipples connected to the individual torch tubular members is connected by a temperature compensating Teflon fitting to one end of a gas delivery tube, which may be, for example, corrugated or accordion pleated Teflon tubing. The fitting itself is similar to those used in the Olewicz patent and comprises a stainless steel tubular threaded member having Teflon ferrules or gaskets therein for clamping the glass nipple to the Teflon gas feed tube. The other end of the gas feed tube is connected, within the housing, to a similar fitting rigidly mounted in a wall of the housing, as by welding, and the external gas delivery tube for the particular nipple is mounted on the external end of the wall mounted fitting. With such an arrangement, the gas delivery tube connected to the nipple is isolated from any exterior stresses, and there is no relative movement of the nipple and gas tube that can occur within the housing. The housing is filled with an inert pressurized gas which, if a leak within the housing occurs, prevents the chemicals and gases from leaking out of the torch. Instead, the inert gas will tend to leak into the torch, which does not alter the proper application of chemicals to the rod. An external gas mixture sensor with an internal probe is connected to a wall of the housing, and the gas within the housing can be monitored for the presence of any of the gases, e.g., hydrogen, oxygen, and HCL, used in the torch. Presence of the component gas or gases will indicate a leak sufficiently large to overcome the presence of the insert gas. Thus, the pressurized gas can be seen to perform two functions as noted.

It is desirable that the interior of the housing be heated, primarily to prevent gas condensation. To this end, the housing has a heating member, such as heating rod, projecting into the interior thereof A temperature sensor is also placed or mounted inside the housing in a location remote from the heating element. This sensor can be in the form of a thermocouple which controls the heating elements. All of these accessory elements are coupled into the interior of the housing through leak-proof coupling members which are basically the same as those for the gas delivery tubes.

The top of the housing is a transparent cover of suitable material such as a transparent, heat resistant, plastic. This enables the operator to observe the interior of the housing to monitor for leaks, cracks, or gas condensation. Even though some leaks or cracks may be small, there will, over a short time, be an observable soot build up at the location of the crack or leak, which tells the operator that, for example, one of the tubes of the torch, or the torch itself, needs immediate replacement.

These and other features and principles of the present invention will be readily apparent from the following detailed description, read in conjunction with the accompanying drawings.

DETAILED DESCRIPTION

Figure 1:
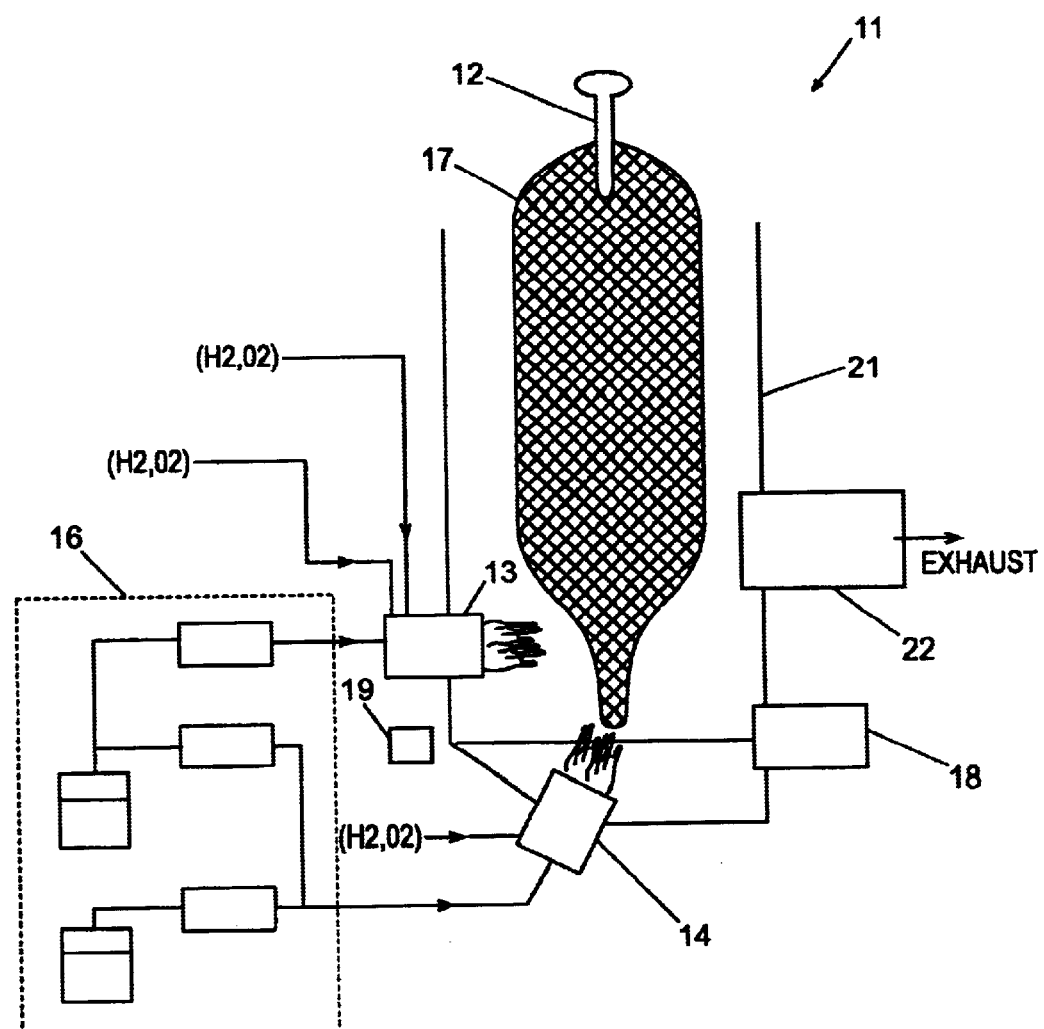
FIG. 1 is a diagrammatic depiction of a VAD system.

FIG. 1 is a schematic view of a VAD system 11 comprising a starting rod 12, which may be of silica glass, one end of which is mounted in a chuck (not shown) and rotated as indicated by the arrow. Initially the end of the rod is directly in the flame of one or more oxygen-hydrogen torches 13 and 14. Vapors from a chemical delivery system 16, shown in dashed lines, flow into and through the glass torches 13 and 14 where they react via flame hydrolysis to form submicroscopic particles which are deposited on the starting rod 12. As the sooty particles build up, the starting rod 12 is moved upward to make room for new growth and continuously rotated to maintain cylindrical symmetry. A position control comprising, for example, a laser 18 and detector 19 may be used to insure proper location of the flame from the torches relative to the starting rod, and, where the torch and rod combination is contained in a housing 21, a housing exhaust 22 may be, and usually is, included. After a soot preform 17 of proper size is built, it is removed from the chuck, dehydrated, and the preform 17 is consolidated, which removes trapped gases and water vapor, to produce a solid glass preform 17 ready for subsequent operations, such as, for example, rod in tube formation and then drawing into fiber.

Figure 2:
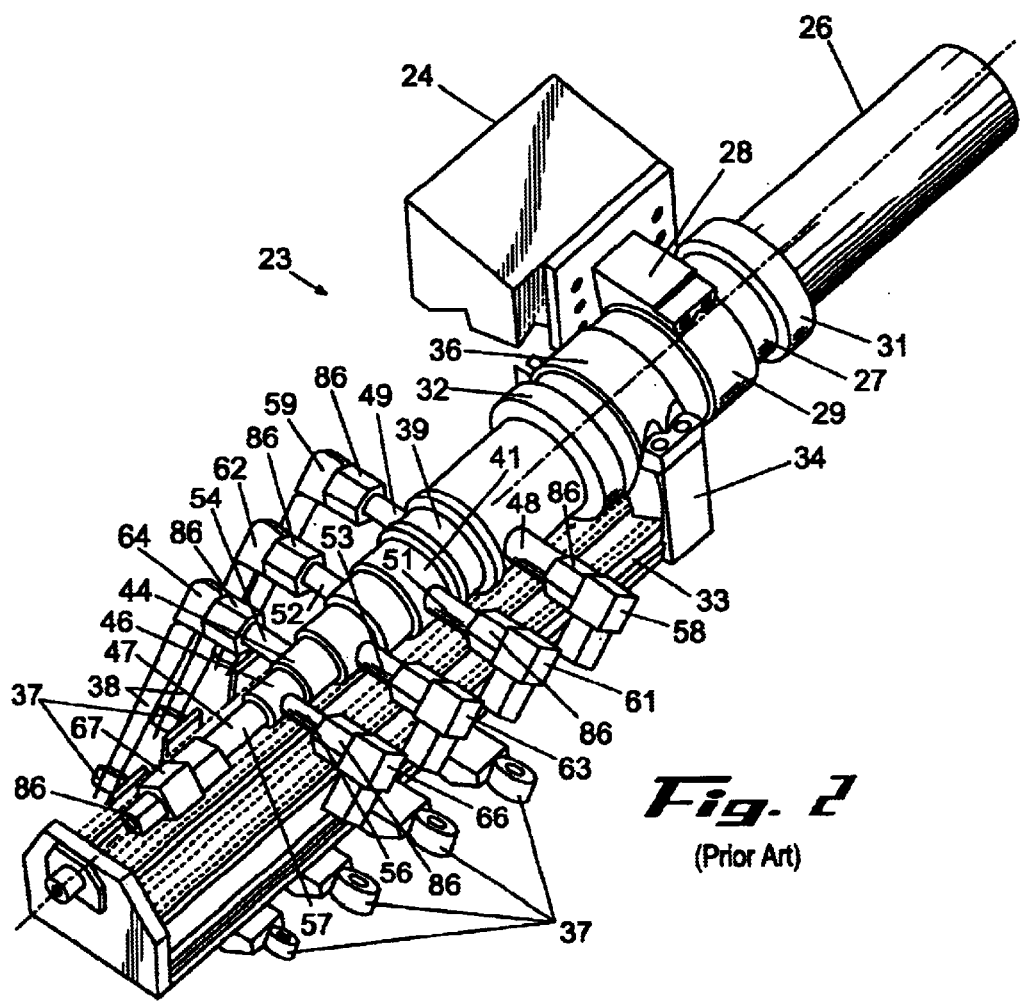
FIG. 2 is a perspective view of an Olewicz type torch for the VAD process of the type for which the present invention is designed.

As discussed hereinbefore, during production runs over extended periods of time, numerous problems arise, and it is to the reduction or elimination of these problems that the Olewicz invention is addressed. FIG. 2 is a perspective view of the VAD torch 23 of the Olewicz invention, shown mounted to an adjusting stage 24 for proper positioning of the torch 23. Except for the mounting. and gas delivery system, the torch of the present invention is substantially the same. Torch 23 comprises a main glass tubular member 26 which, as will be discussed in greater detail hereinafter, is contained in a clamping tube or sleeve 27 of suitable signed and non-fragile material, preferably aluminum, which does not tend to contaminate glass, even at elevated temperatures. The clamping sleeve 27, which is mounted to the adjusting stage 24 by a two piece clamp having a bottom portion 28 and a top portion 29, effectively isolates the main glass tubular member 26 from high mounting clamping pressures, thereby protecting it from possible breakage. Each end of the clamping sleeve or the tube is threaded to receive nuts 31 and 32, the function of which was discussed hereinbefore.

An elongated support rail 33 is mounted to the clamping sleeve 27 by a two part support clamp comprising a bottom portion 34 and a top portion 36 and functions to support a plurality of strain relieving side tube clamps 37, which hold the numerous gas and vapor delivery tubes, such as tube 38, without stressing or other undue distortion, with both transverse and longitudinal adjustment.

In the VAD process, it is usual that several gases, such as oxygen and hydrogen (for the burner flame), and several soot or vapor mixtures are applied through the torch 23 to the starting rod 12 and the preform 17 during the deposition operation. To this end, there is a plurality of nested secondary glass tubes 39, 41, 42, 43, 44, 46, and 47. Main glass tubular member 26 and each of the secondary tubes has a vapor (or gas) delivery nipple, 48, 49, 51, 52, 53, 54, 56, and 57 respectively, to which is mounted a temperature compensating fitting 58 to which are attached the gas or vapor delivery tubes 38. The fittings form substantially leak proof connections to the nipples. This nesting of the secondary tubes as shown in FIG. 2 is shown and explained in U.S. Pat. No. 4,627,866 of Kanamari et al., as well as the Olewicz application.

The torch arrangement 23 of FIG. 2 reduces leakage and misalignment of the components to a considerable extent. However, it can be seen that the gas delivery tubes 38, the fittings 58 and the nipples 48–57 are all exposed, and, despite the stress relieving side tube clamps 37, stresses can still be introduced by accident because of the exposure of the parts, as previously discussed.

Figure 3:
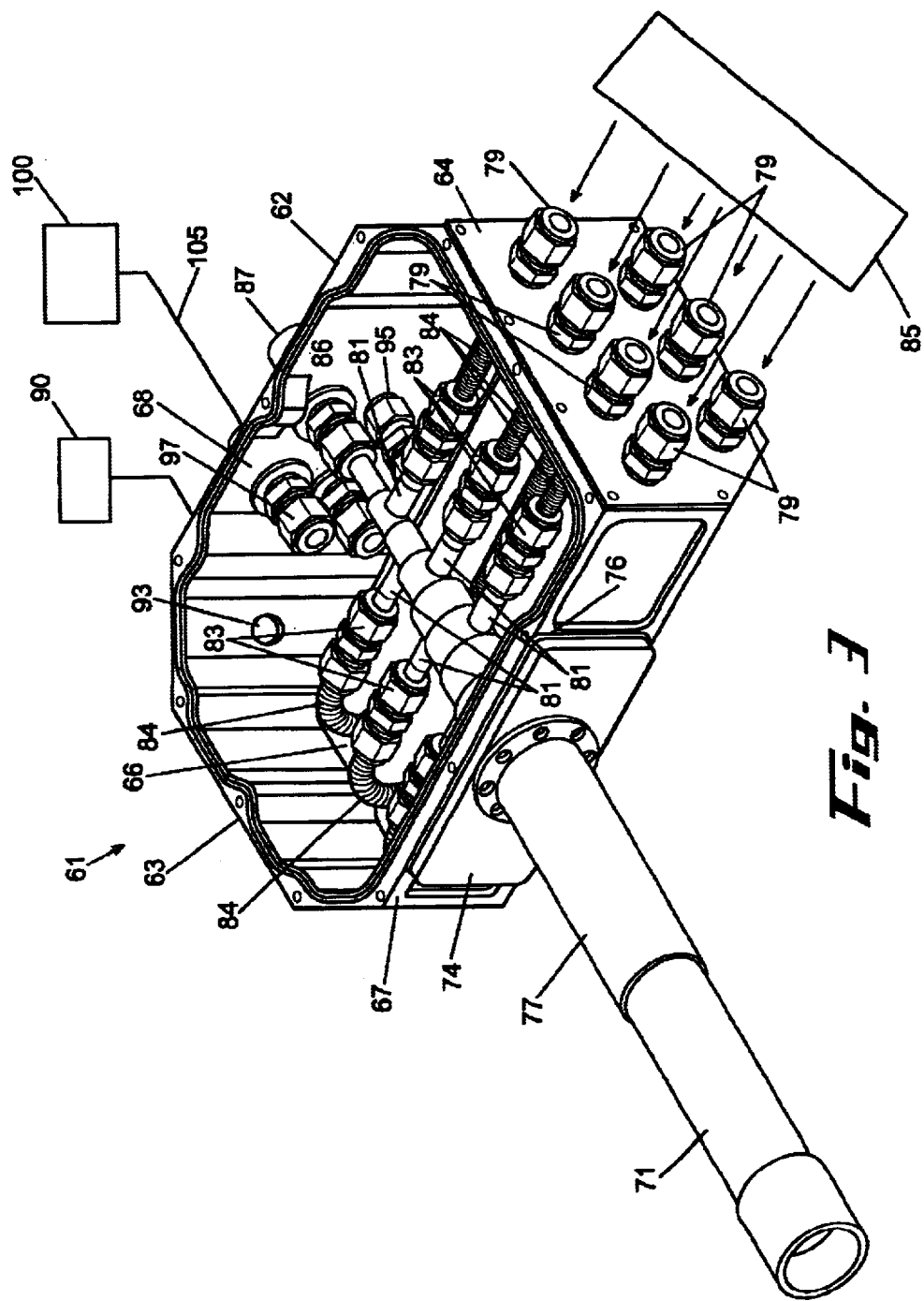
FIG. 3 is a perspective view of the torch and torch housing of the present invention.
Figure 4:
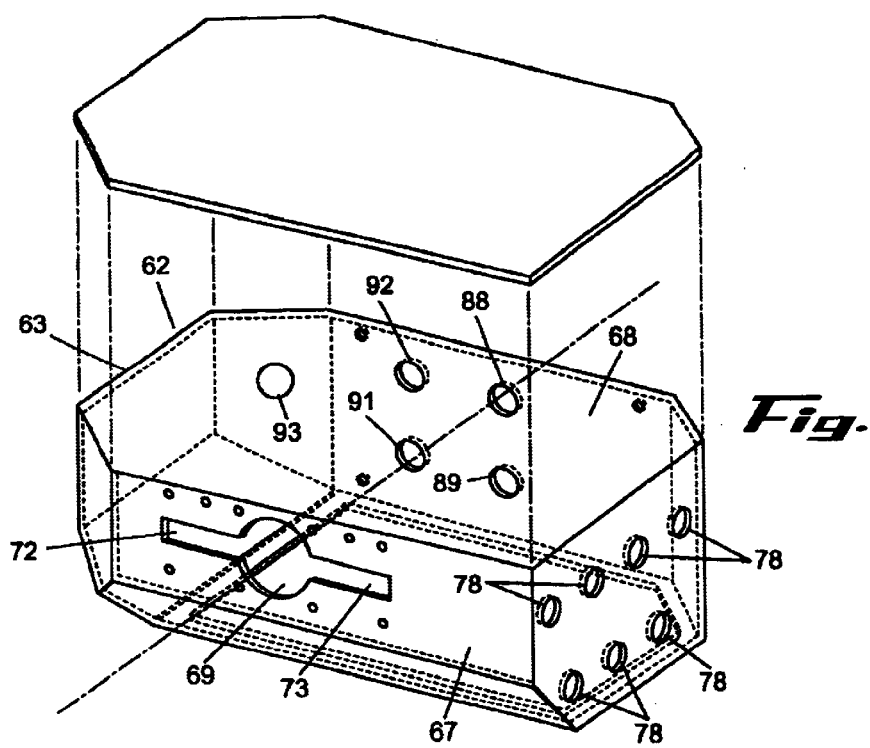
FIG. 4 is a perspective, partially exploded view of the torch housing of the present invention.

In FIG. 3 there is shown a preferred embodiment 61 of the invention, whereby, as will be apparent hereinafter, accidental movement and stresses on the torch are substantially completely prevented. The preferred embodiment 61, as shown in FIGS. 3 and 4, comprises a housing member 62 of a suitable material such as, for example, aluminum, having first and second side walls 63, 64, a base plate 66, and front and rear walls 67 and 68. The front wall 67 has a central aperture 69 therein for receiving the torch 71, which is, preferably, basically the same torch configuration shown in the Olewicz patent. As can best be seen in FIG. 4, first and second slots 72 and 73 which extend from either side of aperture 69 insertion of the torch with its extending side nipples. Plates 74 and 76, separated by an O-ring (not shown) in which torch 71 is precisely positioned and which is guarded by means of a flanged aluminum torch guard 77. The torch guard 77 may be replaced by the torch clamping tube 27 of Olewicz, if desired.

In order for the gas or vapor to be delivered to the torch 71, side wall 64 has a plurality of apertures 78 bored therethrough for receiving leakproof temperature compensating gas delivery fittings 79 which will be discussed more fully hereinafter, and which are preferably welded to side wall 64. The gas delivery fittings 79 receive gas from a source 85 through preferably flexible tubes or conduits, as shown in the Olewicz application. It is to be understood that the apertures 78 and fittings 79 might be in one of the other walls 62 or 63, but the arrangement shown in FIGS. 3 and 4 is to be preferred. Each of the nipples 81 extending from the sides of the torch 71 from each of the tubular glass members 82 has fitted on the distal end thereof a leakproof temperature compensating connector 83 which is substantially identical to fittings 79, to be discussed more fully hereinafter, and which is connected to a corresponding fitting 79 by, for example, a corrugated or accordion pleated Teflon tube 84. It can be seen that in order for the bottom row of fittings 79 to be connected to the corresponding fittings 83, the tubes 84 are folded under the torch 71. The smallest diameter tubular member 86 of torch 71 is connected to a separate leakproof temperature compensating gas delivery fitting 87 which extends through the rear wall 68 of housing 62, mounted in a bore 88.

In addition to the bore 88, there are three other ports or bores 89, 91, and 92, which contain temperature compensating leak proof fittings 95, 96, 97, respectively. An additional bore or port 93 may also be formed in wall 68 for another fitting (not shown). It is to be understood that the location of the various bores may be other than what is shown in FIGS. 3 and 4, so long as they serve the following functions.

Bore 91 and its associated fitting 96 are for mounting a heater cartridge (not shown) which functions to heat the interior of housing 62, and bore 89 and its associated fitting 95 are for mounting a thermocouple or other temperature sensing device (not shown), which is spaced from the heater, to control the temperature within housing 62. Heating the interior of the housing makes it unnecessary to cover the heating lines of the torch with heat tape, which could obscure from direct view the various failure indications due to condensation, or torch fracture. The heater and temperature sensing device are of standard commercially available types and are not shown to avoid crowding FIG. 3.

It is desirable to pressurize the interior of housing 62 with an inert gas. Thus, if a leak path such as a crack in the torch or a loosened fitting occurs, the pressure prevents the gases inside the torch from leaking to the exterior thereof. On the contrary, the inert gas will leak into the torch interior, which is not detrimental to the proper operation of the torch and the heating process. To this end, bore or port 92 and its fitting 97 form a leak proof means for introducing the inert gas from a source 100 via a flexible conduit 105 into the interior of housing 62.

Bore 93 and its fitting (not shown) provide access of the housing interior for allowing gas from inside housing 62 to flow out at a small rate through sensors 90, one of which is shown substantially for monitoring for leakage. Sensor 90 analyzes the interior gases for hydrogen, oxygen, and HCL which will indicate when any of these materials has leaked into the interior of the housing. It is to be understood that other chemical components may also be involved and detected.

Housing 62 has a transparent cap 94 fitted over the top thereof so that the interior of housing 62 may be observed. When a crack in the torch or other leak occurs, there results a buildup of soot at the location of the leak, which can be observed by the operator through the transparent cap 94, thereby indicating a leak or even the very start thereof to serve as a warning that the incipient fault should be corrected before it becomes great enough to interfere seriously with the proper functioning of the apparatus.

Figure 5:
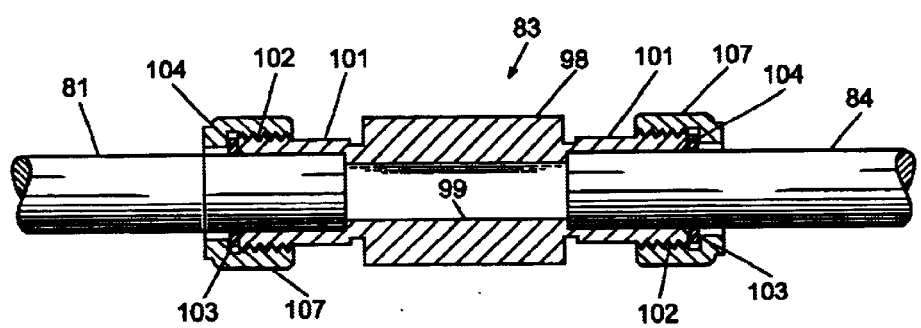
FIG. 5 is a cross-sectional view of the temperature compensating gas delivery fitting of the present invention.
Figure 6:
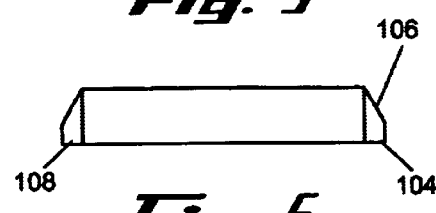
FIG. 6 is a view of a ferrule for use in the fitting of FIG. 5.

The numerous temperature compensating fittings, such as 79, 83, et al. may take the form of such fittings disclosed in the Olewicz application, or such other forms that serve the function of forming substantially leak-proof connections between dissimilar materials. The Olewicz type fitting for connecting a glass nipple 81 to a gas feed tube 84, for example, is shown in FIGS. 5 and 6. FIG. 5 is a cross-sectional view of the fitting 83. Inasmuch as both ends of the fitting 83 are substantially identical, corresponding parts at each end bear the same reference numerals. Fitting 83 is shown mounted on a nipple 81 of the torch 71, and comprises member 98, preferably of stainless steel, for example, having a longitudinal bore 99 extending therethrough. At each end of member 98 is a reduced diameter portion 101 having external threads 102 at the ends thereof, and preferably having an internal chamfered end 103. A circular mounting ferrule 104 preferably of Teflon and having a slope or angled surface 106, as shown in FIG. 6, is mounted in a slip fit on the nipple 81 and, at the other end on gas delivery tube 84 such that the slope 106 bears against the chamfered end 103. A compression nut 107 is threaded onto the threads 102 at each end and bears against the rear surface 108 of ferrule 104. When the nuts 107 are tightened, the ferrules 104 are cammed by the slopes 106 and chamfers 103 into tight engagement with both nipple 81 and gas delivery tube 84, forming a leakproof coupling between nipple 81 and tube 84, without damage to either the nipple 81 or the tube 84. During operation, the fitting 83 is subject to wide swings in temperature which will cause it, over time, to loosen slightly on nipple 81, thereby creating possible leakage. Teflon expands with heat to a greater extent than glass, and this differential expansion can cause leakage, as well as altering the grip of ferrule 104 on nipple 81, which can be observed through transparent cap 94. When this occurs, the nuts 107 can be tightened to restore the grip of the ferrule 104 on nipple 81 with only a momentary interruption in the process. Because member 98 is preferably of stainless steel, or other suitable material, it has a lesser coefficient of expansion with heat than does Teflon, hence it functions to maintain the grip of the Teflon ferrule on nipple 81. The same leakage prevention scheme may be used with the other fittings 79, 95, 96, and 97, and, with some modification, fitting 87, however, these fittings are not subject to the temperature fluctuations to the same extent as fittings 83. The monitoring line fitting in bore 43 (not shown) may also be of the same configuration as that shown in FIG. 5.

A principle feature of the present invention, as is readily apparent from the foregoing, is the stress isolation of the torch. The isolation as shown and described makes possible what has been virtually impossible heretofore, and that is that the torch can be oscillated about a mean position to increase flame coverage or to have the flame cover an area of specific geometry without fear of creating leaks or causing other damage to the torch.

It is to be understood that the various features of the present invention might be incorporated into other types of torch mechanisms and that other modifications or adaptations might occur to workers in the art. All such variations and/or modifications are intended to be included herein as being with the scope of the present invention as set forth in the claims hereinafter. Further, in the claims, the corresponding structures, materials, acts, and equivalents of all means or step-plus-function elements are intended to include any structure, material, or acts for performing the functions in combination with other elements as specifically claimed.

What is claimed is:

1. A mounting assembly for a gas torch wherein the torch has at least one cylindrical flame delivery tube having a nipple extending therefrom for receiving gas from an external source, said mounting assembly comprising:

a housing having first and second side walls and front and rear walls, said front wall having a first opening and said rear wall having a second opening for receiving and supporting the torch which extends through the housing;

a first leakproof fitting affixed in an opening in one of said side walls for receiving gas from an external source; and a second leakproof fitting for connection to a torch nipple on said flame delivery tube, said first and second fittings being connected together by a gas conduit within said housing.

2. A mounting assembly for a gas torch as claimed in claim 1 wherein said one of side walls has a plurality of openings therein, each having a leakproof fitting contained therein, said fittings being joined via gas conduits within the housing to individual leakproof fittings for delivering gas to a plurality of gas receiving nipples on the torch.

3. A mounting assembly for a glass torch as claimed in claim 1 wherein said second opening in said rear wall has a leakproof fitting therein for directly feeding gas to a flame delivery tube of the torch.

4. A mounting assembly for a gas torch as claimed in claim 1 wherein said rear wall has a third opening containing a leakproof fitting therein to which a heating element for heating the interior of the housing is affixed, said housing having a bottom wall, and a cap member forming a top wall.

5. A mounting assembly for a glass torch as claimed in claim 4 wherein said rear wall has a fourth opening containing a leakproof fitting therein to which a temperature sensing device for monitoring the heat within the housing is affixed.

6. A mounting assembly for a glass torch as claimed in claim, 4 wherein said rear wall has a fifth opening containing a leakproof fitting therein for delivering an inert gas to the interior of the housing to create a pressurized atmosphere therein.

7. A mounting assembly for a glass torch as claimed in claim 6 wherein said rear wall has a sixth opening having a leakproof fitting therein for providing a gas egress from the housing for monitoring the gaseous atmosphere within the housing.

8. A mounting assembly for a glass torch as claimed in claim 1 wherein said cap member over the top of said housing is transparent.

9. A mounting assembly for a glass torch as claimed in claim 1 wherein said leakproof fittings are temperature compensating fittings.

10. A mounting assembly for a glass torch as claimed in claim 1 wherein said gas conduits are made of accordion pleated Teflon.

11. A mounting assembly for a glass torch as claimed in claim 10 wherein said gas conduits are accordion pleated.

12. A torch and mount assembly therefor wherein the torch has a cylindrical main flame delivery glass tube comprising:

a plurality of secondary flame delivery tubes of successively smaller diameter concentrically mounted within said main tube;

each of said tubes having a gas receiving nipple thereon;

each of said gas receiving nipples having a first leakproof fitting thereon;

an enclosed housing member having a plurality of walls for supporting said torch which extends through said housing between first and second walls thereof;

a plurality of second leakproof fittings through a third wall of said housing;

a source of gas for supplying gas mixtures to each of said second leakproof fittings; and each of said first leakproof fittings being connected to a corresponding one of said second leakproof fittings by means of a gas conduit within the housing for supplying a gas mixture to each of said nipples.

13. A torch and mount assembly therefor as claimed in claim 12 wherein each of sad leakproof fittings is a temperature compensating fitting.

14. A torch and mount assembly therefor as claimed in claim 12 wherein said gas conduits comprise corrugated Teflon tubing.

15. A torch and mount assembly therefor as claimed in claim 12 wherein said housing has at least one transparent wall.

16. A torch and mount assembly therefor as claimed in claim 12 and further comprising:

a source of inert gas; and a leakproof fitting in one wall of said housing connected to said source of inert gas by means of a gas conduit for producing a pressurized inert gas atmosphere within said housing.

17. A torch and mount assembly therefor as claimed in claim 12 and further comprising:

at least one gas analyzing sensor for monitoring the gaseous content of the interior housing atmosphere connected to the interior of said housing.

18. A torch and mount assembly therefor as claimed in claim 12 and further comprising:

a heating element within said housing for heating the gaseous atmosphere within the housing and a temperature sensing means for monitoring the temperature of the gaseous atmosphere within said housing.

* * * * *